United States Patent [19]

Thorsten et al.

[11] Patent Number: 5,416,867

[45] Date of Patent: May 16, 1995

[54] PASSIVE TEMPERATURE-COMPENSATED OPTICAL WAVE GUIDE COUPLER

[75] Inventors: Neal H. Thorsten, Lebanon, N.J.; Friedrich Zwickel, Whitehall, Pa.

[73] Assignee: AT&T Corp., Murray Hill, N.J.

[21] Appl. No.: 175,072

[22] Filed: Dec. 29, 1993

[51] Int. Cl.6 .................................................. G02B 6/36
[52] U.S. Cl. ........................................ 385/73; 385/72; 385/75
[58] Field of Search ........................ 385/12, 53, 55, 56, 385/58, 70, 72, 73, 74, 75

[56] References Cited

U.S. PATENT DOCUMENTS

| | | | |
|---|---|---|---|
| 4,591,231 | 5/1986 | Kaiser et al. | 385/73 |
| 4,714,318 | 12/1987 | Hayashi et al. | 385/73 |
| 4,848,867 | 7/1989 | Kajioka et al. | 385/73 |
| 5,136,681 | 8/1992 | Takahashi | 385/40 |

*Primary Examiner*—Frank Gonzalez

[57] ABSTRACT

An optical wave guide coupler with an integral signal modifying element that passively compensates for temperature variations by automatically tilting the element and thereby changing its operating characteristics with changes in temperature. The element is also rotatably, yet firmly, supported by the coupler and is retained at a predetermined angle relative to the axis of the coupler so that the operating characteristics of the element may be selectively varied by rotation of the element holder of the coupler.

43 Claims, 4 Drawing Sheets

PASSIVE TEMPERATURE-COMPENSATED OPTICAL WAVE GUIDE COUPLER

FIELD OF THE INVENTION

The present invention relates generally to devices to couple two optical wave guides and, more particularly, to a coupler incorporating a band pass filter and to devices to fine tune and/or rotatably mount an optical device for which the optical characteristics change when rotated.

BACKGROUND OF THE INVENTION

In communications systems employing optical wave guides, such as optical fibers, two or more optical wave guides are typically required to link two communicating devices with one another. Thus, the optical wave guides must be coupled in series to one another so that where one optical wave guide ends another optical wave guide begins. Frequently, at such couplings between optical wave guides, the signal is also filtered to remove noise from the transmitted signal. In the case of optical fiber wave guides, before filtering, the optical signal emitted by the first optical fiber is typically spread and then collimated by a lens so that the signal can be received by the second optical fiber more easily without taking extraordinary measures to precisely align the ends of the fibers; graded index lenses, or so-called GRIN lenses, are generally used for this purpose. Filtering of the transmitted light is frequently accomplished by positioning an optical filter between the output end of the first fiber and the input end of the second optical fiber. The filter screens out unwanted wavelengths of light. In the case of narrow band optical noise filters, substantially all wavelengths except those within a narrow bandwidth of wavelengths, or passband, centered about a center wavelength are removed, thereby removing noise from the transmitted signal. The center wavelength of the filter is selected so that it closely matches the center wavelength of the signal emitted by the lens in the coupler, and the bandwidth of the filter is selected so that the filter will pass at least substantially all of the wavelengths of the signal, thereby eliminating most of the noise which is primarily transmitted at different wavelengths. The center wavelength of narrow band filters is dependent on the angle of the filter with respect to the incident light beam and, in the case of absorption filters, with the level of quality control maintained while the filters are manufactured. It is therefore important that the filter be placed and held securely in the signal path at a precise angle so that the passband selected matches the signal wavelength as closely as possible.

The optical characteristics of most optical filters, however, change with variations in temperature. Temperature changes can result from changes in the environment or heating of the filter caused by the optical signal, typically generated by a laser, impacting upon the filter. For example, when an optical filter is heated, the center wavelength of the passband typically increases. In the case of very narrow band optical filters, if the movement in the center wavelength is sufficiently large, the filter will filter out the entire signal, thereby only transmitting noise. In optical communications systems utilizing wide bandpass filters, the movement of the center wavelength may not be important, however, in newer long distance systems where one or more channels are required with narrow limits on transmitted bandwidths, the magnitude of temperature effects and the resolution required to match the filter to the transmitted signal becomes critical to the performance of the system. To ensure that heating does not eliminate the signal intended to be transmitted, a filter can be fabricated from material or in such a way to reduce the effect of temperature upon the passband. However, the process of manufacturing such filters is complex and inefficient in that many of the resulting articles must be discarded as defective. As a result, such filters are expensive. Another solution is to use low cost filters for which the center wavelengths are relatively susceptible to thermal variations but to maintain the filter at a constant temperature; however, maintaining a constant temperature is often impossible or uneconomical.

One may also, as another alternative, use filters that can be physically, electronically or magnetically altered to vary their filtering characteristics. Such active thermal compensating filters are highly complex, requiring thermal detectors and additional mechanisms to change the filter's optical characteristics as the temperature varies, all of which introduce and increase the possibility of malfunctions.

There is accordingly a need for a low cost, relatively simple optical fiber coupler employing inexpensive filters or other optical elements that can be easily and accurately tuned and that passively and reliably compensate for environmental and/or operational temperature variations.

SUMMARY OF THE INVENTION

The passive temperature-compensated optical wave guide coupler of the present invention comprises three primary sections: an element that modifies or filters transmitted optical signals, an element holder in which the element is mounted, and a body in which the element holder is mounted.

The coupler body has a throughbore extending its entire length along a coupler axis. At the entrance end and at the exit end of the coupler body, an optical wave guide, such as an optical fiber, is mounted within the throughbore so that the ends of the fibers are directed into the body. Collimating lenses are preferably positioned in the body's throughbore to expand, collimate and focus the signals transmitted through the optical fibers. The end of the optical fiber at the signal entrance end of the coupler body is positioned nominally at the focal point of the collimating lens but so that the focal point of the collimating lens is slightly below the center of the optical fiber. As a consequence of this intentional misalignment, the optical signal leaving the entrance collimating lens is collimated along an optical axis disposed at a non-zero angle, $\beta$, relative to the coupler axis of the coupler body.

The element holder has a throughbore extending its entire length and is mounted in the body so that signals emitted from the entrance collimating lens is directed into the element holder's throughbore. At the entrance end of the element holder, the throughbore is substantially coaxial with the coupler axis. At the exit end of the element holder, the holder's throughbore extends along an element axis that is at a predetermined non-zero angle, $\alpha$, relative to the coupler axis of the coupler body.

The optical element, which may be a conventional optical element used to modify an optical signal transmitted through the coupler, such as a filter or polarizer, is mounted into the angled portion of the throughbore of the element holder. As a consequence, the element is disposed along the element axis at the predetermined non-zero angle, $\alpha$, relative to the coupler axis.

Because the optical dement is mounted at an angle, $\alpha$, relative to the coupler axis, rotation of the dement holder effects changes in the optical transmission characteristics of the optical element due to the resulting change of angle of the signal passing through the optical element. If a filter is used as the optical element, the orientation of the filter relative to the coupler axis varies between an angle of $\alpha-\beta$ and an angle of $\alpha+\beta$ as the filter is rotated, thereby altering the center wavelength of the passband of the filter. The center wavelength of the passband and the tuning sensitivity can be controlled by appropriately selecting the angles $\alpha$ and $\beta$. As a result, fine tuning by the coupler of the filtering effect during initial assembly of the coupler may be readily accomplished to ensure that only the noise, and not the signal, is substantially blocked by the filter.

The coupler can be more precisely fine tuned after final assembly by mounting the element holder into the throughbore of the coupler's body using a threaded mounting design that ensures that the element holder is firmly mounted within the coupler's body but also easily permits rotation of the dement holder, and thus the optical element. One end of the element holder has two threaded sections that are axially separated one from another by an interposed unthreaded section. Two substantially parallel cuts are formed in the interposed unthreaded section so that the cuts lie substantially perpendicular or transverse to the coupler axis. The cuts are made from opposite sides of the element holder. One end of the inside surface of the body's throughbore is threaded with threads that match the size and shape of the threads in the two threaded sections of the element holder. To mount the element holder, the length of the base portion is first reduced by about one quarter of a thread pitch by axially compressing the element holder to deform the web created by the cuts. The base portion is then inserted into the coupler body's end and rotated, thereby causing the threads to engage the threads within the body. The press fitting of the element holder into the coupler body causes the threads of the two threaded sections to be urged in opposite directions against the coupler body's threads. As a result, the element holder is stably mounted within the body, thereby preventing the wobble that normally results due to the play between male and female threads. This connection also allows the element holder to be selectively rotated relative to the coupler's body and ensures that the optical element will remain stable at the desired angle with respect to the signal axis.

Additionally, the element holder is comprised of at least two portions formed of materials that have different coefficients of thermal expansion. As previously noted, at least two cuts are made in the element holder substantially perpendicular to the coupler axis but in substantially opposite directions. The cuts are located on opposite sides of the interface between the two materials comprising the element holder, thereby forming two joined cantilevers that thermally expand and contract at different rates. When the coupler, and thus the element holder, undergoes a change in temperature, the difference in thermal expansion rates of the two joined cantilevers causes the element holder to bend. This bending of the element holder changes the angle at which the optical element is mounted within the coupler's body and, correspondingly, the orientation of the optical element relative to the coupler axis and the optical axis. If the optical element is a filter, changing the angular orientation of the filter changes the center wavelength of the passband of the filter; however, when the temperature of the filter is changed, the center wavelength of the passband of the filter is also changed. The depth, width and location of the cuts into the element holder, the coefficients of thermal expansion of the two materials comprising the element holder, and the particular filter are selected so that the change in the filter's optical characteristics due to temperature variations are cancelled out or compensated for by the change in the filter's optical characteristics due to thermally-induced changes in the filter's angular orientation. The element holder may also be comprised of more than two portions of material with different coefficients of thermal expansion, with appropriately located and sized cuts proximate the interfaces between the portions.

The passive temperature-compensated wave guide coupler of the present invention therefore simply and reliably compensates for thermal expansion and can be constructed using inexpensive optical elements and can be accurately tuned to the desired center wavelength.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

FIG. 4a is a cross-sectional view of a form of element holder for the embodiment of the passive temperature-compensated optical wave guide coupler shown in FIG. 2a.

DETAILED DESCRIPTION OF THE PREFERRED EMBODIMENTS

Figure 1A:
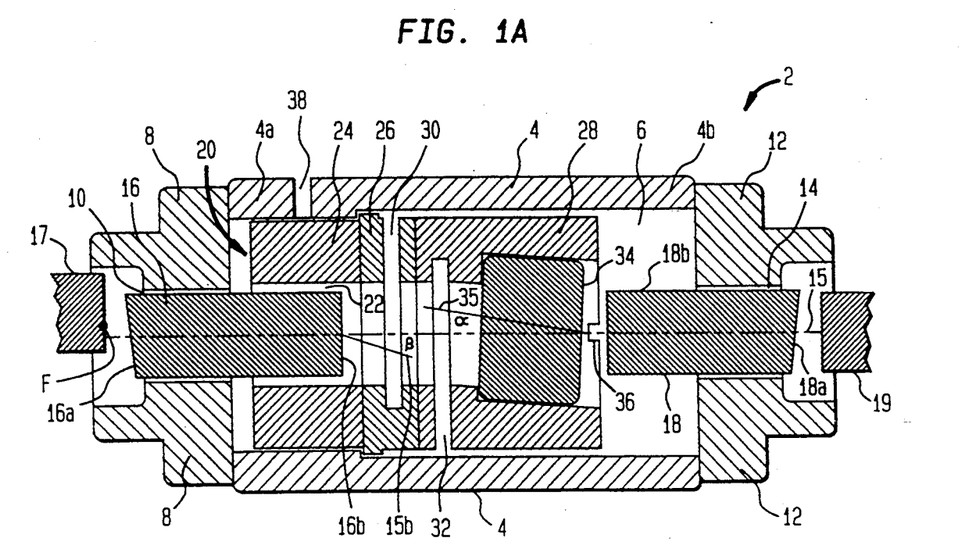
FIG. 1a is a cross-sectional view of a first embodiment of a passive temperature-compensated optical wave guide coupler constructed in accordance with the present invention at an ambient temperature.

Referring initially to FIG. 1a, in which a first embodiment of the passive temperature-compensated optical wave guide coupler of the present invention is shown as the same appears at an ambient temperature, such for example as approximately 20° C., the coupler 2 is comprised of a body 4 that is preferably tubular and cylindrical in shape. Body 4 is formed of a rigid material, such as 304 stainless steel or preferably the iron-nickel-cobalt alloy sold under the trademark KOVAR. Body 4 has a longitudinal central throughbore 6 extending therethrough along its entire length centered along a coupler axis 15. A first lens holder 8, which has a central throughbore 10 passing therethrough, is securely mounted, as for example by laser welding, onto the first end 4a of the body 4. A second lens holder 12, which also has a central throughbore 14 passing therethrough, is similarly securely mounted to a second and opposite end 4b of body 4. First and second lens holders 8, 12 are formed of a rigid material and their central throughbores 10, 14 are axially aligned with the central throughbore 6 of body 4 and coupler axis 15. A first lens 16 is securely mounted to the first lens holder 8 within its central throughbore 10, and a second lens 18 is securely mounted to the second lens holder 12 within its central throughbore 14. First and second lenses 16, 18 extend into the central throughbore 6 of body 4. In the intended use of the coupler 2, two optical wave guides 17, 19, such for example optical fibers, are positioned proximate the external ends 16a, 18a of the first and second lenses respectively so as to form optical connections with the lenses 16, 18 and thereby connect the two wave guides 17, 19 for optical communication through the coupler 2. The first and second lenses 16, 18 expand, collimate and focus the light transmitted by the optical wave guides and are preferably GRIN lenses, which are formed of glass that is appropriately doped so that the lenses have a graded index of refraction. The first and second lens holders 8, 12 are preferably fabricated of a material for which the coefficient of thermal expansion closely approximates that of the lenses 16, 18, such for example as the iron-nickel-cobalt KOVAR alloy.

The end of the optical fiber 17 at the signal entrance end of the coupler body 4 is positioned so that its end is nominally at the focal point F of the entrance collimating lens 16 but so that the focal point F of the collimating lens 16 is slightly below the center of the optical fiber 17. Preferably, the focal point F of the entrance collimating lens 16 is about 0.002 inches lower than the center of the optical fiber 17. As a consequence of this intentional misalignment, the optical signal leaving the entrance collimating lens 16 is collimated along an optical axis 15b disposed at a non-zero angle, $\beta$, of about one to about two degrees relative to the coupler axis 15 of the coupler body 4.

Element holder 20 is tubular in shape, has a central throughbore 22, is rigid, and is mounted within the central throughbore 6 of body 4 so that it slip-fits within the first end 4a of the body 4. During at least the initial assembly and adjustment of the optical coupler of the present invention, as discussed in detail hereinbelow, the element holder 20 is rotatably mounted within the body 4. After assembly and initial adjustment, element holder 20 may be fixedly attached within the first end 4a of body 4. Preferably, however, element holder 20 remains rotatably mounted relative to body 4 even after assembly and initial adjustment using the threaded connector design herein discussed in detail with specific reference to FIGS. 4a and 4b.

With further reference to FIG. 1a, the element holder 20 there shown is formed of three portions fixedly attached to one another— i.e. a base portion 24, a first intermediate portion 26, and a mount portion 28. The base portion 24 is tubular in shape and contacts the inner surface of the first end 4a of body 4. The central throughbore 22 within the base portion 24 of element holder 20 is axially aligned with the central throughbore 6 of body 4, the central throughbore 10 of first lens holder 8, and the coupler axis 15. The end 16b of first lens 16 preferably extends into the central throughbore 22 of base portion 24. The first intermediate portion 26 of element holder 20 is also tubular in shape and has a first intermediate cut 30 which is approximately perpendicular or transverse to the coupler axis 15 of the central throughbore 22 of element holder 20. First intermediate cut 30 extends from the top edge of element holder 20 almost entirely through intermediate portion 26. The central throughbore 22 of first intermediate portion 26 is aligned with and continues the central throughbore of base portion 24. The mount portion 28 of the element holder 20 is tubular in shape and has a mount cut 32 which is approximately perpendicular or transverse to the coupler axis 15 of the central throughbore 22 of element holder 20. Mount cut 32 extends almost entirely through the mount portion 24 of holder 20. Mount cut 32 is approximately parallel to first intermediate cut 30 and extends from the bottom edge of element holder 20. Mount portion 28 has a central throughbore which continues the central throughbore of first intermediate portion 26. However, at the end of mount portion 28, proximate the end 18b of second lens 18, the central throughbore 22 of element holder 20 is angled downward to the right—i.e. so that it extends along an element axis 35 that is at a predetermined angle, $\alpha$, relative to the coupler axis 15. Base portion 24 can be made of any material but the mount portion 28 of element holder 20 is preferably formed of a material that has a coefficient of thermal expansion that is substantially lower than the coefficient of thermal expansion of first intermediate portion 26 of element holder 20. For example, the difference in thermal expansion is between about two and about twenty fold, preferably about ten fold. Preferably, mount portion 28 is formed of a copper-nickel alloy, such as that sold under the trademark INVAR (which has a coefficient of thermal expansion of about $1.7 \times 10^{-6}$ inches/° C.), and base portion 24 and first intermediate portion 26 is fabricated of either 304 stainless steel (which has a coefficient of thermal expansion of about $18.7 \times 10^{-6}$ inches/° C.) or a high purity grade of copper (which has a coefficient of thermal expansion of about $17.0 \times 10^{-6}$ inches/° C.).

An optical or filter element 34 is fixedly mounted within the angled portion of central throughbore 22 of mount portion 28 of element holder 20 so that it intercepts the coupler axis 15, the optical axis 15a and thus the light exiting the first lens 16. Filter element 34 may be a an absorption filter made from silica glass having a number of parallel filtering layers that block substantially all wavelengths of light except wavelengths within a predetermined narrow range of wavelengths, also referred to herein as the bandwidth or passband. The optical characteristics of filter element 34 are selected so that they closely match the optical signal that is intended to be transmitted through coupler 2—i.e. the center wavelength of the light transmitted through filter element 34 should approximately equal that of the collimated signal, excluding noise, and the bandwidth of the light transmitted through the filter element 34 should at least encompass all of the signal wavelengths of the light to be transmitted through coupler 2. For example, the bandwidth of filter element 34 is preferably about 20 angstroms or less. The parallel filtering layers of the filter element 34 are preferably perpendicular to the element axis 35. Because the filter element 34 is mounted at an angle α into element holder 20, the filter element 34 is also disposed at an angle α relative to the coupler axis 15.

In the embodiment shown in FIG. 1a, element holder 20 may be formed by permanently bonding together two slugs of material and then machining the joined, resulting single piece to the desired size and shape, with a central throughbore having two angled portions and the two appropriately oriented cuts. The bonding of the slugs may, for example, be accomplished by conventional oven brazing using a silver braze at about 750° C. or, alternatively, by employing an adhesive. Preferably, however, the slugs of metal are joined by inertia welding. In this welding technique one slug is placed into a holder so that it does not rotate, and a second slug is placed into the collet of a rotatable flywheel and is rotated at a predetermined very high rotational velocity relative to the first slug. When the two slugs are brought into pressure contact, the heat caused by friction between the surfaces of the two slugs forges the slugs together at the contact surfaces, thereby fusing the slugs once rotation by the flywheel is discontinued and the slugs are permitted to cool. This inertia welding technique allows the portions of the element holder to fuse together without any intervening layers of solder or adhesive that might adversely affect the temperature compensating ability of the element holder 20, as discussed in detail below. Inertia welding is particularly preferred since, using that process, two substantially dissimilar metals, including those with significantly different coefficients of thermal expansion, can be securely and easily fastened together. For example, although it is costly and difficult to join copper and the INVAR alloy by conventional oven brazing, such joinder is readily accomplished using inertia welding.

Prior to use, the coupler 2 is preferably fine tuned so that the transmitted light is appropriately filtered. The entire coupler is then assembled—except that the second lens holder 12, with its associated second lens 18 and second optical fiber 19, are not connected to the remainder of coupler 2. An optical signal is transmitted through the first optical fiber 17 into first lens 16 by which the light signal is spread out and collimated. The collimated light emitted by first lens 16 enters filter 34. Filter 34 only transmits light within a predetermined limited bandwidth of wavelengths, thereby eliminating noise from the transmitted signal. Because filter element 34 is mounted in element holder 20 along the element axis 35 at a non-zero angle, α, relative to the coupler axis 15 and because the optical axis 15b is tilted at a non-zero angle, β, with respect to the coupler axis 15, when element holder 20, and thereby filter element 34, is rotated about coupler axis 15 of body 4, the center wavelength of the passband of light transmitted by filter element 34 changes. The collimated light transmitted through filter element 34 is captured optically and input to an optical spectrum analyzer to determine whether the appropriate wavelengths of light are being transmitted through the filter element 34. If the desired filtering is not occurring, element holder 20 is rotated relative to body 4 by inserting an instrument—such, for example, as a screwdriver—into a slot 36 in element holder 20 and rotating the instrument and filter element 34 until the coupler is appropriately tuned, at which point the base portion 24 of element holder 20 is fixedly and nonrotatably attached within body 4 by applying solder or an adhesive through an access aperture 38. The second lens holder 12 and its associated second lens 18 and optical fiber 19 are then actively aligned and securely mounted, as for example by laser welding, onto the second end 4b of body 4. Preferably, however, element holder 20 remains rotatably mounted relative to body 4 even after assembly and initial adjustment using the threaded connector design discussed below with specific reference to FIGS. 4a and 4b. When this threaded connector design is used, the element holder 20—and therefore filter element 34—may be further rotated for fine tuning as and whenever necessary, even after final assembly of the coupler, by using a pin inserted through the aperture 38 to rotate the element holder 20 relative to body 4. The ability to fine tune filter element 34 after final assembly is particularly useful should the coupler need to be tuned to a different center wavelength or should the filter element 34 require further post-assembly fine tuning.

Figure 1B:
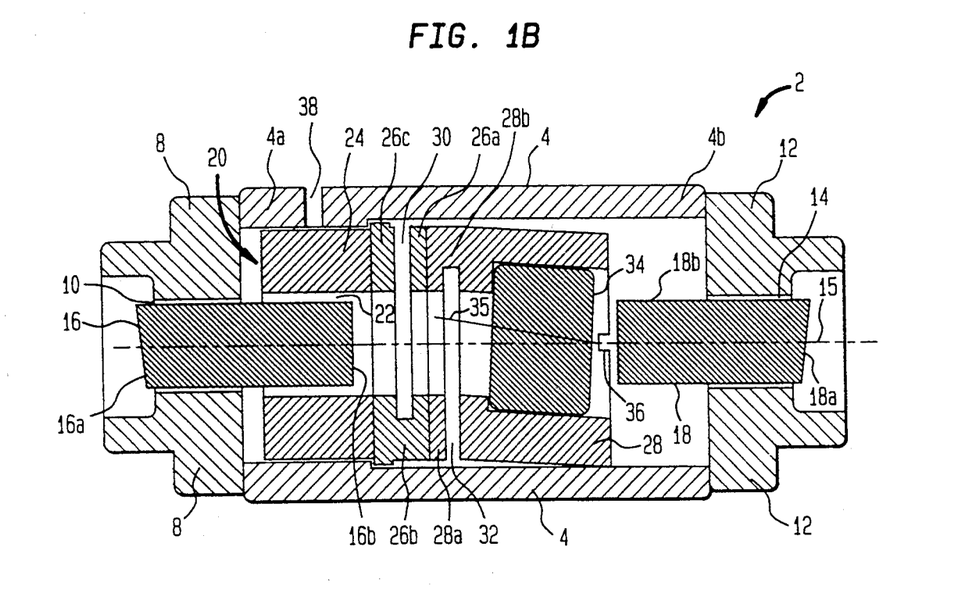
FIG. 1b is a cross-sectional view of the embodiment of the passive temperature-compensated optical wave guide coupler shown in FIG. 1a at an elevated temperature.

FIG. 1b depicts the passive temperature-compensated optical wave guide coupler of FIG. 1a at an elevated temperature after the various metal elements of the coupler have undergone a measurable thermal expansion. In FIG. 1b, the mount portion 28 is angled downward (from its FIG. 1a, ambient temperature orientation) toward the lower inner surface of body 4. The bending or angular reorientation or displacement of element holder 20 is caused by the different degrees of thermal expansion undergone by the first intermediate portion 26 relative to mount portion 28 at the interface between the two portions.

To describe in detail how element holder 20 bends with increasing temperature, some additional portions of element holder 20 shown in FIGS. 1a and 1b require further identification. Thus, the right first intermediate cantilever portion 26a of first intermediate portion 26 is that part located to the right of the first intermediate cut 30; the first intermediate fulcrum 26b is the part located below first intermediate cut 30. The left mount cantilever portion 28a of mount portion 28 is the part located to the left of mount cut 32 while the mount fulcrum 28b is the part located above mount cut 32. It should be appreciated that because the element holder 20 is a three-dimensional object, the cantilever portions 26a, 28a are substantially thin rings.

Figure 4A:
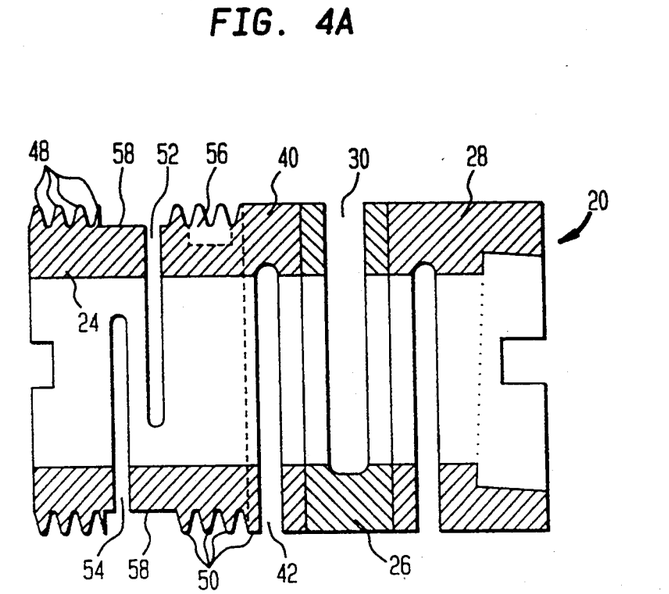
Figure 4B:
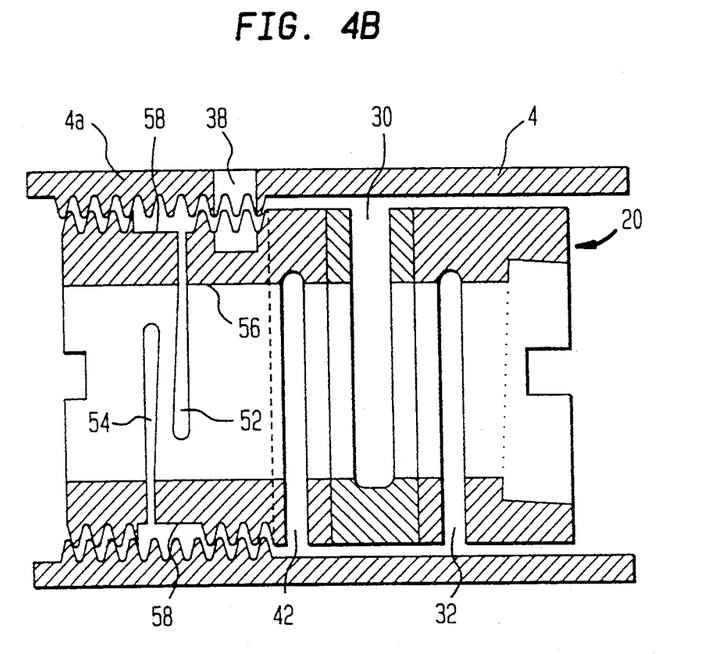
FIG. 4b is a cross-sectional view of the element holder shown in FIG. 4a after it has been inserted into the base of the coupler of the present invention.

As the coupler 2 and element holder 20 are heated, the right first intermediate cantilever portion 26a expands and, in particular, lengthens to a greater extent than the left mount cantilever portion 28a. As a result, the cantilever portions 26a, 28a assume a somewhat curved configuration that increases with increasing temperature. Because the cantilever portions 26a, 28a are each attached to the remainder of element holder 20 at only one point (i.e. at the fulcrums 26b, 28b, respectively), mount portion 28 deforms or bends downward. The thickness of the rings forming the cantilever portions 26a, 28a and the depth of the cuts 30, 32 control the flexibility and, thus, the extent of bending of element holder 20. Thus, decreasing the thickness of the cantilever portions 26a, 28a and/or increasing the depth of the cuts 30, 32, increases the flexibility of element holder 20 and therefore increases the amount that element holder 20 bends as the temperature rises. Although first intermediate portion 26 is shown and described as being formed of a material different than that of base portion 24, these two portions may alternatively be fabricated of the same material. The material comprising base portion 24 is preferably selected to facilitate the cutting of threads therein as shown in FIGS. 4a and 4b, discussed in detail below.

Referring to FIG. 1b, as the temperature rises, the center wavelength of the passband of light transmitted by the filter element 34 increases. However, the downward tilting of filter element 34 due to thermal expansion of the element holder 20 decreases the center wavelength of the filter element 34. Conversely, as the temperature decreases, the center passband wavelength decreases; however, the decrease in temperature also causes filter element 34 to tilt upward thereby increasing its center wavelength. By selecting appropriate metal alloys for forming the various portions of element holder 20, appropriate thicknesses of the cantilever portions 26a, 28a, appropriate depths of the cuts 30, 32, and an appropriate filter element 34, all changes in the optical characteristics of the filter element 34 due to changes in temperature may be completely or at least substantially eliminated.

Figure 2A:
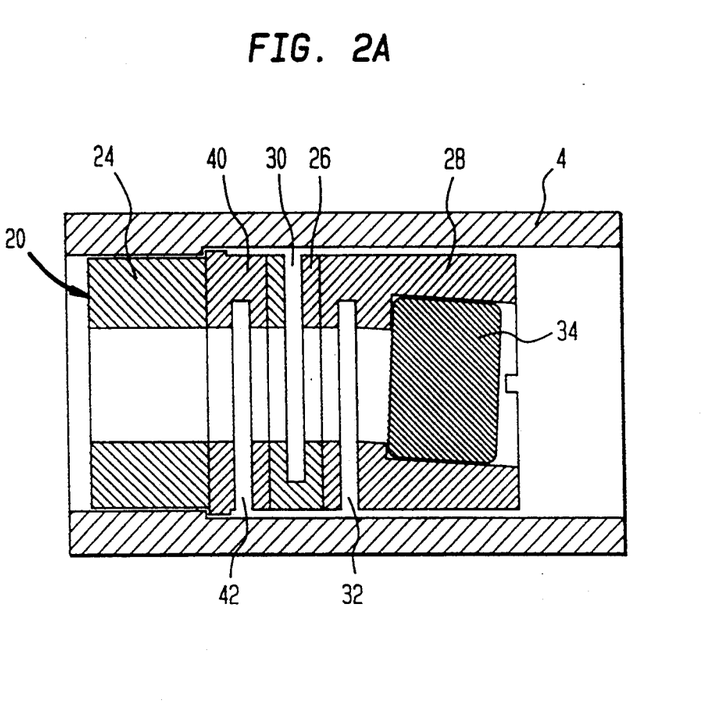
FIG. 2a is a cross-sectional view of a second embodiment of a passive temperature-compensated optical wave guide coupler constructed in accordance with the present invention at an ambient temperature.
Figure 2B:
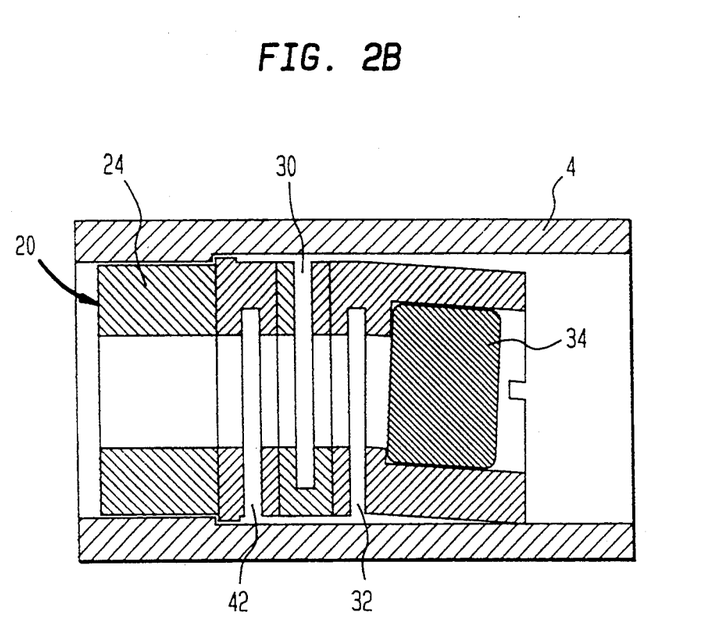
FIG. 2b is a cross-sectional view of the embodiment of the passive temperature-compensated optical wave guide coupler shown in FIG. 2a at an elevated temperature.

In FIGS. 2a and 2b, a simplified drawing of another embodiment of the present invention depicts only the body 4, element holder 20 and filter element 34, the remaining elements of the coupler 2 being omitted for clarity. FIGS. 2a and 2b show the modified coupler 2, in which two intermediate portions of the element holder 20 are present, at an ambient temperature and at an elevated temperature, respectively. Specifically, element holder 20 includes a mount portion 28, a first intermediate portion 26, a second intermediate portion 40, and a base portion 24. In this second embodiment, the mount portion 28 and second intermediate portion 40 have coefficients of thermal expansion that are preferably the same as one another and are lower than that of the first intermediate portion 26. Here, too, the first intermediate cut 30 is made from the top into the first intermediate portion 26 and mount cut 32 is made from the bottom into mount portion 28. In addition, the second intermediate cut 42 is made from the bottom into the second intermediate portion 40. In the double intermediate portion element holder 20 shown in FIGS. 2a and 2b, bending of the element holder 20 is similarly caused by different rates of thermal expansion at the bimetallic interfaces. Although the second intermediate portion 40 is shown as being formed of a material different than that of base portion 24, these two portions may alternatively be fabricated of the same material, as in the embodiment shown in FIGS. 4a and 4b and described hereinbelow. Moreover, while the second intermediate portion 40 and the mount portion 28 may be fabricated of the same material, this is not required. All that is necessary is that there be a significant difference in the coefficients of thermal expansion at the interfaces between the mount portion 28 and the first intermediate portion 26, and between first intermediate portion 26 and second intermediate portion 40.

Figure 3A:
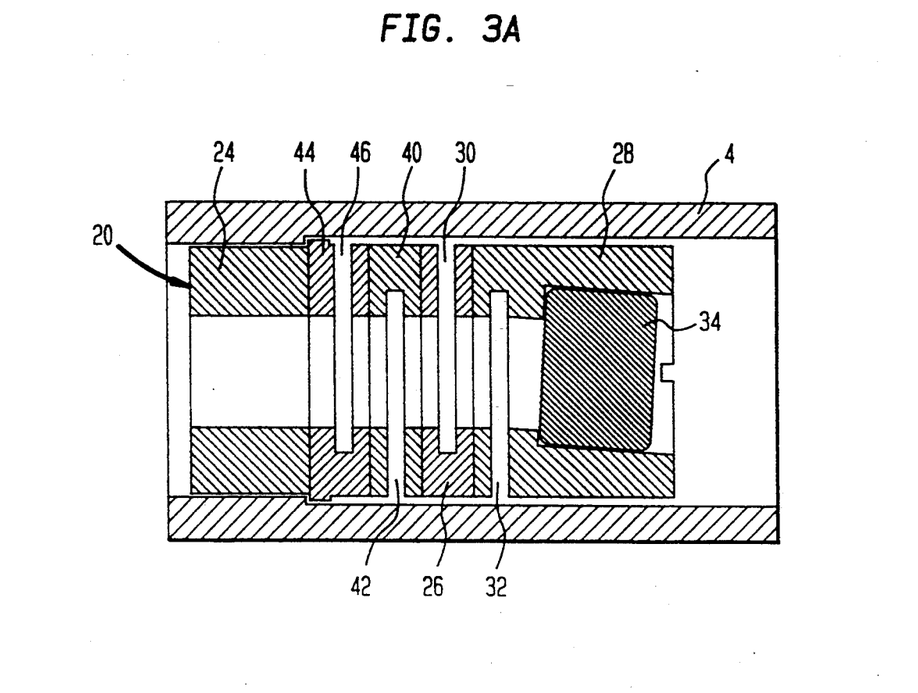
FIG. 3a is a cross-sectional view of a third embodiment of a passive temperature-compensated optical wave guide coupler constructed in accordance with the present invention at an ambient temperature.
Figure 3B:
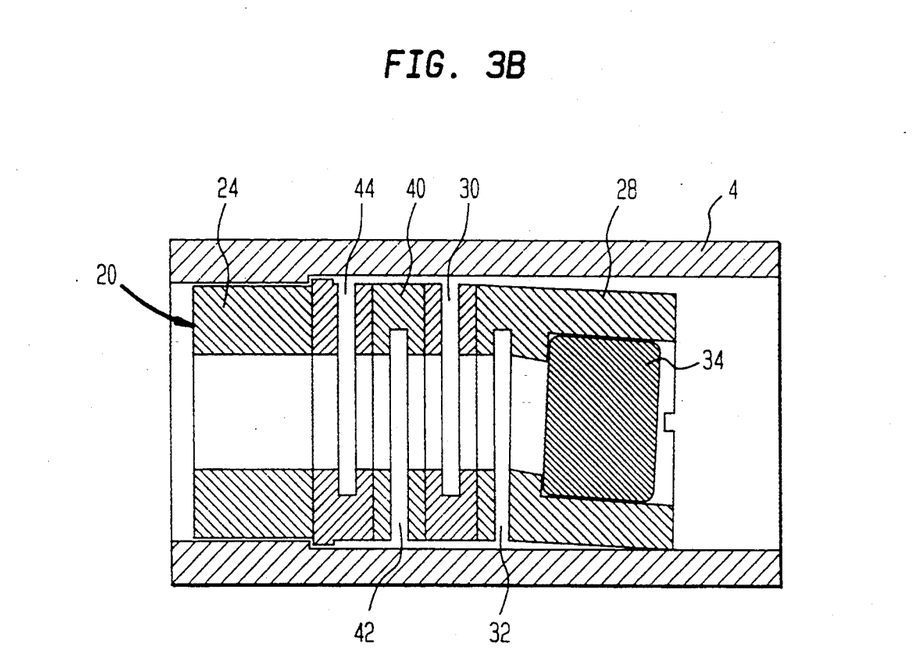
FIG. 3b is a cross-sectional view of the embodiment of the passive temperature-compensated optical wave guide coupler shown in FIG. 3a at an elevated temperature.

In FIGS. 3a and 3b, a simplified drawing of another embodiment of the present invention, in which three intermediate portions of the dement holder 20 are present, is shown at an ambient temperature and at an elevated temperature, respectively. In this third embodiment, the element holder 20 includes a mount portion 28, first intermediate portion 26, second intermediate portion 40, third intermediate portion 44, and base portion 24. In this further modification, the mount portion 28 and second intermediate portion 40 have coefficients of thermal expansion that are preferably the same and are lower than that of first intermediate portion 26 and third intermediate portion 44. Mount portion 28, first intermediate portion 26 and second intermediate portion 40 have the same cuts 32, 30 and 42, respectively, as in the first and second embodiments depicted in FIGS. 1 and 2. In addition, a third intermediate cut 46 is defined from the top into the third intermediate portion 44. Again, in the triple intermediate portion element holder 20 shown in FIGS. 3a and 3b, bending of the element holder 20 is similarly caused by the different rates of thermal expansion at the bimetallic interfaces. Although the third intermediate portion 44 is shown and described as being formed of a material different than that of base portion 24, these two portions may alternatively be fabricated of the same material. Moreover, while second intermediate portion 40 and mount portion 28 may be fabricated of the same material, and first intermediate portion 26 and third intermediate portion 44 of the same material, this is not required. All that is necessary is that there be a suitable and significant difference in the coefficients of thermal expansion at the interfaces between the mount portion 28 and the first intermediate portion 26, between the first intermediate portion 26 and the second intermediate portion 40, and between the second intermediate portion 40 and the third intermediate portion 44.

Referring now to FIG. 4a, a design is shown for rotatably, yet securely, mounting the element holder 20 within the central throughbore 6 of body 4. In this fourth embodiment, the element holder 20 includes two intermediate portions 26, 40 and three cuts 32, 30 and 42. The second intermediate portion 40 is depicted as being formed of the same material as that comprising base portion 24. Base portion 24 has a first threaded section 48 and a second threaded section 50 spaced apart from one another by an intervening unthreaded section 58. Between the two threaded sections 48, 50, two oppositely-directed cuts 52, 54 are made into the unthreaded section 58 of base portion 24—a first cut 52 from the top, and a second cut 54 from the bottom. The two cuts 52, 54 are approximately parallel to one another. There is no particular significance to the orientation of the cuts 52, 54 (i.e. whether they extend from the top downward or from the bottom upward); the only requirement is that they extend inward and be about 180° in orientation to each other. The inside surface of the first end 4a of body 4 is machined so that it has one continuous threading, as shown in FIG. 4b. The threading on the inside surface of the first end 4a of body 4 approximately matches, in size and shape, that on the base portion 24 and extends into the end 4a for at least as far as the distance between the first threaded section 48 and second threaded section 50.

FIG. 4b shows the element holder 20 mounted into body 4. To mount the element holder 20, the length of the base portion 24 is reduced by approximately one quarter of a thread pitch by axially compressing the element holder 20 to deform the web created by the cuts 52, 54. The base portion 24 is then inserted into the first end 4a of body 4 and rotated, thereby causing the threads of the first threaded section 48 and the second threaded section 50 of base portion 24 to engage the threads within the first end 4a of body 4. The press fitting of element holder 20 into body 4 causes the threads of the two threaded sections 48, 50 to be urged in opposite directions against the threads in body 4, as shown in FIG. 4b. As a result, element holder 20 is stably mounted within body 4 so that it cannot slide to the left or right or shake upward, downward or sideways but can still nevertheless be selectively rotated relative to body 4 for fine tuning the angular orientation and, thus, the center wavelength of filter element 34. Rotation of element holder 20 may be accomplished by inserting an instrument, as for example a pin, through an aperture 38 in body 4 into a recess 56 defined in base portion 24 and effecting rotation of element holder 20. The depths of cuts 52, 54 and the distance between them may be altered to change the resiliency or flexibility of the base portion 24 of element holder 20 and, therefore, the tightness of the rotatable mounting of element holder 20 within body 4. As the cuts 52, 54 are deepened and/or their separation decreases, the mounting tightness of element holder 20 in body 4 decreases.

While there have been shown and described and pointed out fundamental novel features of the invention as applied to several preferred embodiments thereof, it will be understood that various omissions and substitutions and changes in the form and details of the disclosed apparatus, and in their operation, may be made by those skilled in the art without departing from the spirit of the invention. It is the intention, therefore, to be limited only as indicated by the scope of the claims appended hereto.

For example, although the present invention has been described with specific reference to optical fibers, optical devices, and the transmission of light signals, the invention may also be used in conjunction with other types of wave guides, devices and electromagnetic wave signals.

Moreover, while the element holder 20 has been depicted as having up to three intermediate portions and four cuts, additional intermediate portions and/or cuts may also be used to provide element holder 20 with additional or increased flexibility to provide the required amount of thermal compensation. The various portions of element holder 20 may also be formed of more than two alloys with different coefficients of thermal expansion—i.e. each portion of the element holder 20 may be made from a different alloy.

Additionally, the alloys comprising the various portions of the element holder 20 may be switched, so long as the angle of inclination of filter element 34 is modified in a direction to compensate for temperature induced center wavelength drift. Other such relatively minor modifications may be made to similarly implement a passive thermal compensated coupler in accordance with the invention.

Furthermore, although the element holder 20 has been shown and described in connection with the rotation of a filter element to fine tune its center passband, other optical devices that undergo changes in optical characteristics with rotation and/or temperature may be employed, such as, for example, a polarizing lens or Faraday rotator. Similarly, the dual-thread rotatable connector design disclosed as rotatably and firmly supporting the mounting element holder 20 within body 4 may be used for any optical application in which a device requires rotation but must also be firmly clamped in position.

Additionally, the optical wave guide coupler of the present invention may be incorporated into or built onto a single substrate. In this embodiment, the optical wave guides are mounted at opposed ends of the substrate thereby forming a coupler axis. The substrate is appropriately configured to form the collimating lenses located at the appropriate positions along the coupler axis relative to the fibers. The element holder 20, having its transverse cuts and in which the filter or optical wave guide element is disposed at an angle relative to the coupler axis and/or is rotationally disposed, is mounted into a recess located in the substrate between the integrated collimating lenses along the coupler axis. If the optical wave guides are sufficiently short in length, they too can be incorporated into the substrate by appropriately doping the substrate.

What is claimed is:

1. An optical wave guide coupler for coupling two optical wave guides for passing optical signals through said coupler from one coupled optical wave guide to the other, comprising:

a body having means at opposed ends of said body for coupling the optical wave guides to said body along a coupler axis;

an element holder disposed within said body and having a throughbore substantially aligned with the coupler axis; and an optical wave guide element supported by said element holder along an element axis and disposed so as to intercept said coupler axis;

said element holder comprising:

a first portion for supporting said optical wave guide element within said element holder throughbore and having a first cut defined partially through said element holder first portion and disposed transverse to said element holder throughbore, said first portion being formed of a first material having a first coefficient of thermal expansion; and a second portion having a second cut defined partially through said element holder second portion and disposed transverse to said element holder throughbore, said second portion being formed of a second material having a second coefficient of thermal expansion different from said first coefficient;

said first and second materials being selected, and said first and second cuts being positioned and defined, so that expansion and contraction of the first and second materials of said first and second element holder portions with changes in temperature cause predetermined orientational changes in the support of said optical wave guide element by said element holder relative to the coupler axis such that said orientational changes compensate for temperature change-induced changes in directional transmission of optical signals through said optical wave guide element.

2. The optical wave guide coupler of claim 1, wherein said first coefficient of thermal expansion is more than about two times larger that said second coefficient of thermal expansion.

3. The optical wave guide coupler of claim 1, wherein said first coefficient of thermal expansion is between about two and about twenty times larger than said second coefficient of thermal expansion.

4. The optical wave guide coupler of claim 1, wherein said element holder is rotatably mounted to said body.

5. The optical wave guide coupler of claim 1, wherein said optical wave guide element comprises an optical filter.

6. The optical wave guide coupler of claim 1, wherein said element axis of said optical wave guide element is disposed at a predetermined first non-zero angle relative to coupler axis.

7. The optical wave guide coupler of claim 6, further comprising means for transmitting collimated optical signals from at least one of said optical wave guides to said optical wave guide element at a predetermined second non-zero angle relative to said coupler axis.

8. The optical wave guide coupler of claim 1, wherein said first and second cuts in said element holder first and second portions extend in substantially opposite directions.

9. The optical wave guide coupler of claim 1, wherein said body has a throughbore extending between said body ends and wherein said element holder further comprises an attachment portion at an end of said element holder opposite said first portion, said attachment portion comprising:
- a first threaded section having threads;
- a second threaded section having threads; and
- a third section interposed between said first and second threaded sections, said third section having two cuts defined substantially transverse to the coupler axis and extending partially through said element holder in substantially opposite directions;
- wherein a first end of said body has threads defined within the body throughbore, and the threads of said first and second threaded sections of said element holder are configured for threaded engagement with said threads defined in the body throughbore.

10. The optical wave guide coupler of claim 1, wherein said element holder further comprises a third portion positioned so that said element holder second portion is interposed between said element holder first and third portions, said element holder third portion being comprised of a third material having a third coefficient of thermal expansion substantially different from said second coefficient of thermal expansion, said element holder third portion having a third cut defined partially through said element holder third portion and disposed transverse to the coupler axis, said third material being selected, and said third cut being positioned and defined, so that expansion and contraction of the first, second and third materials of said first, second and third element holder portions with changes in temperature cause predetermined orientational changes in the support of said optical wave guide element by said element holder relative to the coupler axis such that said orientational changes compensate for temperature change-induced changes in directional transmission of optical signals through said optical wave guide element.

11. The optical wave guide coupler of claim 10, wherein said element holder third portion is comprised of the material comprising said element holder first portion.

12. The optical wave guide coupler of claim 10, wherein said element holder is rotatably mounted to said body.

13. The optical wave guide coupler of claim 10, wherein said optical wave guide element comprises an optical filter.

14. The optical wave guide coupler of claim 10, wherein said element axis of said optical wave guide element is disposed at a predetermined first non-zero angle relative to the coupler axis.

15. The optical wave guide coupler of claim 14, further comprising means for transmitting collimated optical signals from at least one of said optical wave guides to said optical wave guide element at a predetermined second non-zero angle relative to said coupler axis.

16. The optical wave guide coupler of claim 10, wherein said first and second cuts in said element holder first and second portions extend in substantially opposite directions, and said third cut in said element holder third portion extends in substantially the same direction as said first cut in said element holder first portion.

17. The optical wave guide coupler of claim 10, wherein said body has a throughbore extending between said body ends and wherein said element holder further comprises an attachment portion at an end of said element holder opposite said first portion, said attachment portion comprising:
- a first threaded section having threads;
- a second threaded section having threads; and
- a third section interposed between said first and second threaded sections, said third section having two cuts defined substantially transverse to the coupler axis and extending partially through said element holder in substantially opposite directions;
- wherein a first end of said body has threads defined within the body throughbore, and the threads of said first and second threaded sections of said element holder are configured for threaded engagement with said threads defined in the body throughbore.

18. The optical wave guide coupler of claim 10, wherein said element holder further comprises a fourth portion positioned so that said element holder third portion is interposed between said element holder second and fourth portions, said element holder fourth portion being comprised of a fourth material having a fourth coefficient of thermal expansion substantially different from said third coefficient of thermal expansion, said element holder fourth portion having a fourth cut defined partially through said element holder fourth portion and disposed transverse to the coupler axis, said fourth material being selected, and said fourth cut being positioned and defined, so that expansion and contraction of the first, second, third and fourth materials of said first, second, third and fourth element holder portions with changes in temperature cause predetermined orientational changes in the support of said optical wave guide element by said element holder relative to the coupler axis such that said orientational changes compensate for temperature change-induced changes in directional transmission of optical signals through said optical wave guide element.

19. The optical wave guide coupler of claim 18, wherein said element holder fourth portion is comprised of the material comprising said element holder second portion, and said element holder third portion is comprised of the material comprising said element holder first portion.

20. The optical wave guide coupler of claim 18, wherein said element holder is rotatably mounted to said body.

21. The optical wave guide coupler of claim 18, wherein said optical wave guide element comprises an optical filter.

22. The optical wave guide coupler of claim 18, wherein said element axis of said optical wave guide element is disposed at a predetermined first non-zero angle relative to the coupler axis.

23. The optical wave guide coupler of claim 22, further comprising means for transmitting collimated optical signals from at least one of said optical wave guides to said optical wave guide element at a predetermined second non-zero angle relative to said coupler axis.

24. The optical wave guide coupler of claim 18, wherein said first and second cuts in said element holder first and second portions extend in substantially opposite directions, said third cut in said element holder third portion extends in substantially the same direction as said first cut in said element holder first portion, and said fourth cut in said element holder fourth portion extends in substantially the same direction as said second cut in said element holder second portion.

25. The optical wave guide coupler of claim 18, wherein said body has a throughbore extending between said body ends and wherein said element holder further comprises an attachment portion at an end of said element holder opposite said first portion, said attachment portion comprising:
a first threaded section having threads;
a second threaded section having threads; and
a third section interposed between said first and second threaded sections, said third section having two cuts defined substantially transverse to the coupler axis and extending partially through said dement holder in substantially opposite directions;
wherein a first end of said body has threads defined within the body throughbore, and the threads of said first and second threaded sections of said element holder are configured for engagement with said threads defined in the body throughbore.

26. An optical wave guide coupler for coupling two optical wave guides for passing optical signals through said coupler from one coupled optical wave guide to the other, comprising:
a body having means at opposed ends of said body for coupling the optical wave guides to said body along a coupler axis;
an element holder rotatably disposed within said body and having a throughbore substantially aligned with the coupler axis; and
an optical wave guide element supported by said element holder along an element axis and disposed so as to intercept said coupler axis, the element axis of said optical wave guide element being disposed at a predetermined first non-zero angle relative to the coupler axis so that rotation of said element holder causes changes in transmission of optical signals through said optical wave guide element.

27. The optical wave guide coupler of claim 26, wherein said element holder further comprises:
a first portion for supporting said optical wave guide element within said element holder throughbore and having a first cut defined partially through said element holder first portion and disposed transverse to said element holder throughbore, said first portion being formed of a first material having a first coefficient of thermal expansion; and
a second portion having a second cut defined partially through said element holder second portion and disposed transverse to said element holder throughbore, said second portion being formed of a second material having a second coefficient of thermal expansion different from said first coefficient;

said first and second materials being selected, and said first and second cuts being positioned and defined, so that expansion and contraction of the first and second materials of said first and second element holder portions with changes in temperature cause predetermined orientational changes in the support of said optical wave guide element by said element holder relative to the coupler axis such that said orientational changes compensate for temperature change-induced changes in directional transmission of optical signals through said optical wave guide element.

28. The optical wave guide coupler of claim 27, wherein said first coefficient of thermal expansion is more than about two times larger that said second coefficient of thermal expansion.

29. The optical wave guide coupler of claim 27, wherein said first coefficient of thermal expansion is between about two and about twenty times larger than said second coefficient of thermal expansion.

30. The optical wave guide coupler of claim 27, wherein said optical wave guide element comprises an optical filter.

31. The optical wave guide coupler of claim 27, wherein said first and second cuts in said element holder first and second portions extend in substantially opposite directions.

32. The optical wave guide coupler of claim 26, wherein said body has a throughbore extending between said body ends and wherein said optical wave guide element is located at a first end of said element holder and said dement holder further comprises an attachment portion at an end of said dement holder opposite said dement holder first end, said attachment portion comprising:
a first threaded section having threads;
a second threaded section having threads; and
a third section interposed between said first and second threaded sections, said third section having two cuts defined substantially transverse to the coupler axis and extending partially through said dement holder in substantially opposite directions;
wherein a first end of said body has threads defined within the body throughbore, and the threads of said first and second threaded sections of said dement holder are configured for threaded engagement with said threads defined in the body throughbore.

33. The optical wave guide coupler of claim 23, wherein said optical wave guide element is an optical filter.

34. The optical wave guide coupler of claim 26, further comprising means for transmitting collimated optical signals from at least one of said optical wave guides to said optical wave guide element at a predetermined second non-zero angle relative to said coupler axis.

35. An optical wave guide coupler for coupling two optical wave guides for passing optical signals through said coupler from one coupled optical wave guide to the other, comprising:
a body having opposed ends and a throughbore extending between said ends along a coupler axis, and means at each said end for coupling an optical signal-carrying optical wave guide to said body, said body having threads defined within the body throughbore;

an element holder disposed within said body throughbore and having a throughbore substantially aligned with the coupler axis; and an optical wave guide element supported by said dement holder at a first end of said dement holder along an element axis and disposed so as to intercept said coupler axis;

said element holder comprising an attachment portion at an end of said element holder opposite said element holder first end, said attachment portion comprising:

a first threaded section having threads;

a second threaded section having threads; and a third section interposed between said first and second threaded sections, said third section having two cuts defined substantially transverse to the coupler axis and extending partially through said element holder in substantially opposite directions;

wherein the threads of said first and second threaded sections of said element holder are configured for threaded engagement with said threads defined in the body throughbore.

36. The optical wave guide coupler of claim 35, wherein said element holder further comprises:

a first portion for supporting said optical wave guide element within said element holder throughbore and having a first cut defined partially through said element holder first portion and disposed transverse to said element holder throughbore, said first portion being formed of a first material having a first coefficient of thermal expansion; and a second portion having a second cut defined partially through said element holder second portion and disposed transverse to said element holder throughbore, said second portion being formed of a second material having a second coefficient of thermal expansion different from said first coefficient;

said first and second materials being selected, and said first and second cuts being positioned and defined, so that expansion and contraction of the first and second materials of said first and second element holder portions with changes in temperature cause predetermined orientational changes in the support of said optical wave guide element by said element holder relative to the coupler axis such that said orientational changes compensate for temperature change-induced changes in directional transmission of optical signals through said optical wave guide element.

37. The optical wave guide coupler of claim 36, wherein said first coefficient of thermal expansion is more than about two times larger that said second coefficient of thermal expansion.

38. The optical wave guide coupler of claim 36, wherein said first coefficient of thermal expansion is between about two and about twenty times larger than said second coefficient of thermal expansion.

39. The optical wave guide coupler of claim 36, wherein said optical wave guide element comprises an optical filter.

40. The optical wave guide coupler of claim 36, wherein the element axis of said optical wave guide dement is disposed at a predetermined first non-zero angle relative to the coupler axis.

41. The optical wave guide coupler of claim 40, further comprising means for transmitting collimated optical signals from at least one of said optical wave guides to said optical wave guide dement at a predetermined second non-zero angle relative to said coupler axis.

42. The optical wave guide coupler of claim 36, wherein said first and second cuts in said element holder first and second portions extend in substantially opposite directions.

43. The optical wave guide coupler of claim 35, wherein said optical wave guide element is an optical filter.

* * * * *